US 12,143,487 B2

(12) United States Patent
Lu et al.

(10) Patent No.: US 12,143,487 B2
(45) Date of Patent: Nov. 12, 2024

(54) METHOD FOR REALIZING OFF-LINE INITIALIZATION OF HARDWARE WALLET AND EQUIPMENT THEREOF

(71) Applicant: Feitian Technologies Co., Ltd., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 158 days.

(21) Appl. No.: 17/294,496

(22) PCT Filed: Nov. 5, 2019

(86) PCT No.: PCT/CN2019/115620
§ 371 (c)(1),
(2) Date: May 17, 2021

(87) PCT Pub. No.: WO2020/134591
PCT Pub. Date: Jul. 2, 2020

(65) Prior Publication Data
US 2021/0409213 A1    Dec. 30, 2021

(30) Foreign Application Priority Data
Dec. 29, 2018  (CN) .................. 201811630994.X

(51) Int. Cl.
*H04L 9/00*  (2022.01)
*H04L 9/08*  (2006.01)
*H04L 9/32*  (2006.01)

(52) U.S. Cl.
CPC .......... *H04L 9/0897* (2013.01); *H04L 9/0863* (2013.01); *H04L 9/0869* (2013.01); *H04L 9/3226* (2013.01); *H04L 9/3236* (2013.01)

(58) Field of Classification Search
CPC ... H04L 9/0897; H04L 9/0863; H04L 9/0869; H04L 9/3226; H04L 9/3236;
(Continued)

(56) References Cited

U.S. PATENT DOCUMENTS

2016/0117679 A1*  4/2016  Braski ................ G06Q 20/3821
                                                              705/64
2018/0075453 A1    3/2018  Durvasula et al.
(Continued)

FOREIGN PATENT DOCUMENTS

CN    107480986 A    12/2017
CN    108510258 A     9/2018
(Continued)

OTHER PUBLICATIONS

"Andreas Antonopoulos., Mastering Bitcoin: Programming the open blockchain, 2017, O'Reilly Media Inc, pp. 1-130" (Year: 2017).*
(Continued)

*Primary Examiner* — Kevin Ayala
(74) *Attorney, Agent, or Firm* — Maier & Maier, PLLC

(57) ABSTRACT

A hardware wallet generates a key seed according to a mnemonic phrase length when receiving information of building hardware wallet, generates multiple mnemonic word identifications according to the mnemonic phrase length and the key seed, searches for a corresponding mnemonic word from a preset dictionary according to the mnemonic word identification, joints the mnemonic words to obtain a mnemonic phrase, generates a master key according to the key seed and stores the master key; searches for a corresponding mnemonic word from the preset dictionary according to a letter of a word when receiving information of restoring hardware wallet, obtains a key seed according to a length of selection information, generates a master key according to the key seed and authenticates the master key,
(Continued)

stores the master key if the master key is authenticated successfully; and sets the hardware wallet state as initialized.

16 Claims, 5 Drawing Sheets

(58) Field of Classification Search
CPC . H04L 9/0643; H04L 9/0861; H04L 2209/56; G06F 21/76
See application file for complete search history.

(56) References Cited

U.S. PATENT DOCUMENTS

| | | | |
|---|---|---|---|
| 2020/0193420 A1* | 6/2020 | Vogel | G06Q 20/3829 |
| 2021/0398134 A1* | 12/2021 | Dumas | G06Q 20/3674 |
| 2022/0078009 A1* | 3/2022 | Gu | H04L 9/0847 |

FOREIGN PATENT DOCUMENTS

| | | | |
|---|---|---|---|
| CN | 108665250 A | 10/2018 | |
| CN | 108960824 A | 12/2018 | |
| CN | 109687975 A | 4/2019 | |
| CN | 107480986 B * | 8/2019 | ........... G06Q 20/065 |

OTHER PUBLICATIONS

"Derrick Chan, CryptKi: Mobile Hardware Wallet, Jun. 14, 2018, pp. 1-79" (Year: 2018).*

"Atif Nabi, Analytic Study on Android-based Crypto-Currency Wallets, 2018, pp. 1-35" (Year: 2018).*

International Search Report issued on Feb. 1, 2020 in corresponding International Application No. PCT/CN2019/115620; 5 pages.

Chinese Office Action issued on Dec. 18, 2019 in corresponding application No. 201811630994.X; 6 pgs.

* cited by examiner

METHOD FOR REALIZING OFF-LINE INITIALIZATION OF HARDWARE WALLET AND EQUIPMENT THEREOF

CROSS-REFERENCE TO RELATED APPLICATIONS

This application is a national stage of International Application No. PCT/CN2019/115620, filed on Nov. 5, 2019, which claims priority to Chinese Patent Application No. 201811630994.X, filed on Dec. 29, 2018. The disclosures of the aforementioned applications are hereby incorporated by reference in their entireties.

FIELD OF THE INVENTION

The present application relates to the field of electronic products, especially relates to a method for realizing off-line initialization of a hardware wallet and an equipment thereof.

BACKGROUND

A hardware wallet, which stores a digital assets private key in a chip, is separated from the internet, and the hardware wallet can be used when it is connected to an upper computer. At the moment, the hardware wallet needs to connect to the upper computer via a cable, a USB cable for instance.

A user must input confidential information when the hardware wallet is connecting to the upper computer via a cable during the initialization process, however, the private information of the user may be intercepted if the upper computer is controlled by a malicious software, and thus the digital assets of the user may be lost.

SUMMARY

The object of the present application is to overcome the deficiencies of the prior art, and to provide a method for realizing off-line initialization of a hardware wallet and an equipment thereof.

The present application provides a method for realizing off-line initialization of a hardware wallet, including:

Step S1, determining, by a hardware wallet, a type of an operation triggering information after the operation triggering information is received by the hardware wallet from a user, executing Step S2 in the case that the operation triggering information is building hardware wallet; executing Step S4 in the case that the operation triggering information is restoring hardware wallet;

Step S2, prompting, by the hardware wallet, the user to input a mnemonic phrase length, generating a key seed according to the mnemonic phrase length received from the user, generating multiple mnemonic word identifications according to the mnemonic phrase length and the key seed, searching for a corresponding mnemonic word from a preset dictionary according to each mnemonic word identification successively, and jointing the found mnemonic words successively to obtain a mnemonic phrase, and generating a master key according to the key seed and storing the master key;

Step S3, setting, by the hardware wallet, a hardware wallet state as initialized, and performing normal operation;

Step S4, prompting, by the hardware wallet, the user to input a letter of a word, searching for a corresponding mnemonic word from the preset dictionary according to the received letter of the word and displaying the found mnemonic word, and prompting the user to select;

Step S5, determining, by the hardware wallet, whether selection information input by the user is a complete mnemonic phrase after the selection information is received from the user, if yes, executing Step S6; otherwise, returning to Step S4;

Step S6, obtaining, by the hardware wallet, the key seed according to the length of the selection information input by the user, generating the master key according to the key seed, and authenticating the master key, in the case that the master key is authenticated successfully, storing the master key, setting the hardware wallet state as initialized, and performing normal operation.

Furthermore, before the Step S1, the method includes: the hardware wallet powering on, determining whether the hardware wallet is initialized, if yes, the hardware wallet performing normal operation; otherwise, executing Step S1.

Furthermore, the determining whether the hardware wallet is initialized specifically includes: determining, by the hardware wallet, whether the hardware wallet is initialized according to the hardware wallet state, if the hardware wallet state is initialized, the hardware wallet performing normal operation; otherwise, executing Step S1.

Furthermore, Step S1 specifically is:

displaying, by the hardware wallet, an initialization interaction option interface, waiting for receiving the operation triggering information sent from the user via a human-computer interaction module, determining the type of the operation triggering information, executing Step S2 in the case that the operation triggering information is building hardware wallet; executing Step S4 in the case that the operation triggering information is restoring hardware wallet.

Furthermore, between the Step S1 and the Step S2, the method includes: informing, by the hardware wallet, the user of setting an identity authentication way, executing Step S2 in the case that the identity authentication way is set successfully; otherwise, reporting an error;

Between the Step S1 and the Step S4, the method includes: informing, by the hardware wallet, the user of setting the identity authentication way, executing Step S4 in the case that the identity authentication way is set successfully; otherwise, reporting an error.

Furthermore, the informing, by the hardware wallet, the user of setting the identity authentication way specifically includes: informing, by the hardware wallet, the user of setting a PIN code.

Furthermore, informing, by the hardware wallet, the user of setting the PIN code includes:

Step A1, prompting, by the hardware wallet, the user to set the PIN code, determining whether the PIN code is legitimate after the PIN code input by the user is received, if yes, executing Step A2; otherwise, returning to Step A1;

Step A2, determining, by the hardware wallet, a number of times of inputting legitimate PIN code by the user, executing Step A3 if the number of times is two; updating the number of times of inputting legitimate PIN code by the user and returning to Step A1 if the number of times is one; reporting an error if the number of times is three;

Step A3, determining, by the hardware wallet, whether the legitimate PIN codes received for two times are identical, if yes, the user identity is authenticated successfully; otherwise, returning to Step S1.

Furthermore, the determining whether the PIN code is legitimate specifically is: determining whether a length of the PIN code is in a preset scope, if yes, the PIN code is legitimate; otherwise, the PIN code is illegitimate.

Furthermore, in the case of determining that the PIN code is illegitimate in Step A1, before returning to Step A1, the method further includes: determining, by the hardware wallet, whether a number of times of setting PIN code incorrectly reaches a preset number of times, if yes, reporting an error, and returning to Step S1; otherwise, updating the number of times of setting PIN code incorrectly, and returning to Step A1.

Furthermore, the Step S2 includes:

Step S2-1, prompting, by the hardware wallet, the user to input the mnemonic phrase length, calculating a key seed length and a first check value according to the mnemonic phrase length in the case that the mnemonic phrase length input by the user is received, generating a key seed of corresponding length according to the key seed length;

Step S2-2, clearing, by the hardware wallet, data in a security storage, generating the master key according to the key seed via a second preset algorithm, and storing the master key into the security storage;

Step S2-3, operating, by the hardware wallet, a first preset algorithm on the key seed to obtain a first calculation result, intercepting data of a first check value length from a start bit of the first calculation result to obtain the first check value, jointing the first check value with the key seed to obtain a mnemonic phrase identification; intercepting data segments of preset length successively from the mnemonic phrase identification to obtain multiple mnemonic word identifications; searching for corresponding mnemonic words from the preset dictionary according to the mnemonic word identifications, and jointing the found mnemonic words successively to obtain the mnemonic phrase.

Furthermore, the calculating the key seed length and the first check value according to the mnemonic phrase length in Step S2-1 specifically is: multiplying, by the hardware wallet, the mnemonic phrase length by the second preset value to generate the mnemonic phrase identification length; obtaining the key seed length and the first check value length from the mnemonic phrase identification length according to a preset ratio;

the generating the key seed of corresponding length according to the key seed length specifically is: generating, by the hardware wallet, a random number of the key seed length as the key seed by using a real random number generator.

Furthermore, the generating the master key according to the key seed via the second preset algorithm in Step S2-2 specifically is: operating hash calculation on the key seed according to the second preset algorithm to obtain a hash value; taking data of preset length on high-order end of the hash value as the master key.

Furthermore, between the Step S2 and Step S3, the method includes:

Step P1, generating and displaying, by the hardware wallet, an exam term according to the mnemonic phrase and the preset dictionary, and prompting the user to select;

Step P2, determining, by the hardware wallet, whether the selection information input by the user is correct according to the mnemonic word after receiving the selection information from the user, if yes, executing Step S3; otherwise, returning to Step P1.

Furthermore, the Step P1 specifically is: displaying, by the hardware wallet, the mnemonic phrase via a displaying screen of human-computer interaction module, generating the exam term according to a subject phrase and the preset dictionary and displaying the exam term on the displaying screen, and prompting the user to select via the displaying screen.

Furthermore, when the determination is no in Step P2, the method further includes: resetting, by the hardware wallet, the number of times for user selection;

Between the Step P2 and Step S3, the method further includes: determining, by the hardware wallet, whether the number of times for user selection reaches a preset number of times, if yes, executing Step S3; otherwise, updating the number of times for user selection, and returning to Step P1.

Furthermore, the Step S4 specifically is: prompting, by the hardware wallet, the user to input the letter of the word via the displaying screen of the human-computer interaction module, searching for the corresponding mnemonic word from the preset dictionary according to the letter after receiving the letter input by the user via the key of the human-computer interaction module; displaying, by the hardware wallet, the found mnemonic word via the displaying screen of the human-computer interaction module and displaying information of prompting the user to select on the displaying screen.

Furthermore, before the Step S4, the method includes: prompting, by the hardware wallet, the user to input the mnemonic phrase length, and executing Step S4 after the mnemonic phrase length is received;

The Step S5 specifically is: determining, by the hardware wallet, whether the length of the selection information input by the user is equal to the mnemonic phrase length after receiving the selection information input by the user, if yes, executing Step S6; otherwise, returning to Step S4.

Furthermore, the Step S6 includes:

Step S6-1, clearing, by the hardware wallet, data from the security storage, searching for the mnemonic word identification corresponding to each mnemonic word from the mnemonic phrase preset dictionary, jointing the found mnemonic word identifications successively to obtain the mnemonic phrase identification;

Step S6-2, calculating, by the hardware wallet, the key seed length according to the mnemonic phrase identification length, intercepting data of the key seed length successively from the mnemonic phrase identification to obtain the key seed, and using the data of mnemonic phrase identification except the key seed as a second check value;

Step S6-3, operating, by the hardware wallet, the first preset algorithm on the key seed to obtain the first calculation result, intercepting data having a length equal to the second check value from the start bit of the first calculation result to obtain a first comparison value, and determining whether the second check value matches with the first comparison value, if yes, executing Step S6-4; otherwise, reporting an error;

Step S6-4, generating, by the hardware wallet, the master key according to the key seed via the second preset algorithm and storing the master key into the security storage, setting the hardware wallet state as initialized, and informing the user that the hardware wallet is initialized successfully via the displaying screen, and performing normal operation.

The present application further provides an equipment for realizing off-line initialization of a hardware wallet, including:

a first receiving module, which is configured to receive operation triggering information from a user;

a first determining module, which is configured to determine a type of the operation triggering information received by the first receiving module, to trigger a prompting and generating module in the case that the operation triggering information is building hardware wallet; to trigger a prompting and searching module in the case that the operation triggering information is restoring hardware wallet;

the prompting and generating module, which is configured to prompt the user to input a mnemonic phrase length, generate a key seed according to the received mnemonic phrase length, generate multiple mnemonic word identifications according to the mnemonic phrase length and the key seed, search for a corresponding mnemonic word according to each mnemonic word identification successively from a preset dictionary, and joint the found mnemonic words successively to obtain a mnemonic phrase, generate a master key according to the key seed and store the master key, and trigger a first setting module;

the first setting module, which is configured to set a hardware wallet state as initialized, and the hardware wallet performs normal operation;

the prompting and searching module, which is configured to prompt the user to input a letter of a word, search for a corresponding mnemonic word from the preset dictionary according to the received letter and display the found mnemonic word, prompt the user to select, and receive selection information from the user;

a second determining module, which is configured to determine whether the selection information received by the prompting and searching module is a complete mnemonic phrase, if yes, to trigger an obtaining and authenticating module; otherwise, to trigger the prompting and searching module;

the obtaining and authenticating module, which is configured to obtain the key seed according to the length of the selection information input by the user, and generate a master key according to the key seed and authenticate the master key;

a storing and setting module, which is configured to store the master key after the master key is authenticated successfully by the obtaining and authenticating module, and set the hardware wallet state as initialized, and the hardware wallet performs normal operation.

Furthermore, the equipment includes a third determining module, which is configured to determine whether the hardware wallet is initialized after the hardware wallet powers on, if yes, the hardware wallet performs normal operation; otherwise, to trigger the first receiving module.

Furthermore, the third determining module is specifically configured to determine whether the hardware wallet is initialized according to the hardware wallet state after the hardware wallet powers on, if the hardware wallet is initialized, the hardware wallet performs normal operation; otherwise, to trigger the first receiving module.

Furthermore, the first receiving module is specifically configured to display an initialization interaction option interface, wait for receiving the operation triggering information sent from the user via a human-computer interaction module.

Furthermore, the equipment further includes:

a second setting module, which is configured to inform the user of setting an identity authentication way in the case that the first determining module determines the operation triggering information is building hardware wallet, to trigger the prompting and generating module in the case that the identity authentication way is set successfully; and is further configured to inform the user of setting the identity authentication way in the case that the first determining module determines the operation triggering information is restoring hardware wallet, and to trigger the prompting and searching module in the case that the identity authentication way is set successfully; to report an error in the case that the identity authentication way is set unsuccessfully.

Furthermore, the second setting module is specifically configured to inform the user of setting a PIN code if the first determining module determines the operation triggering information is building hardware wallet, and to trigger the prompting and generating module if the PIN code is set successfully; and is further configured to inform the user of setting a PIN code if the first determining module determines the operation triggering information is restoring hardware wallet, to trigger the prompting and searching module if the PIN code is set successfully; to report an error if the PIN code is set unsuccessfully.

Furthermore, the second setting module includes:

a first prompting and receiving unit, which is configured to prompt the user to set the PIN code, and to receive the PIN code input by the user;

a first determining unit, which is configured to determine whether the PIN code is legitimate after the first prompting and receiving unit receives the PIN code input by the user, if yes, to trigger a second determining unit; otherwise, to trigger the first prompting and receiving unit;

the second determining unit, which is configured to determine a number of times of inputting legitimate PIN code by the user, to trigger a third determining unit if the number of times is two; to update the number of times of inputting legitimate PIN code by the user and to trigger the first prompting and receiving unit if the number of times is one; to report an error if the number of times is three;

the third determining unit, which is configured to determine whether the legitimate PIN codes received for two times are identical, if yes, the user identity is authenticated successfully, and to trigger the prompting and generating module or the prompting and searching module; otherwise, to trigger the first prompting and receiving unit.

Furthermore, the first determining unit is specifically configured to determine whether a length of the PIN code is within a preset scope when the first prompting and receiving unit receives the PIN code input by the user, if yes, the PIN code is legitimate, and the second determining unit is triggered; otherwise, the PIN code is illegitimate, and the first prompting and receiving unit is triggered.

Furthermore, the second setting module further includes:

a fourth determining unit which is configured to determine whether a number of times of setting PIN code incorrectly reaches a preset number of times when the first determining unit determines the PIN code is illegitimate, if yes, to report an error and to trigger the first receiving module; otherwise, to update the number of times of setting PIN code incorrectly and to trigger the first prompting and receiving unit.

Furthermore, the prompting and generating module includes
- a second prompting and receiving unit which is configured to prompt the user to input the mnemonic phrase length, and receive the mnemonic phrase length input by the user;
- a calculating and generating unit which is configured to calculate a key seed length and a first check value according to the mnemonic phrase length received by the second prompting and receiving unit, and to generate a key seed of corresponding length according to the key seed length;
- a generating and storing unit which is configured to clear data in a security storage, generate the master key according to the key seed generated by the calculating and generating unit via a second preset algorithm, and to store the master key into the security storage;
- a calculating and jointing unit which is configured to operate a first preset algorithm on the key seed to obtain a first calculation result, intercept data of a first check value length from the start bit of the first calculation result to obtain the first check value, joint the first check value after the key seed to obtain a mnemonic phrase identification; intercept data segments of preset length successively from the mnemonic phrase identification to obtain multiple mnemonic word identifications; search for corresponding mnemonic words according to the mnemonic word identifications from the preset dictionary, joint the found mnemonic words successively to obtain the mnemonic phrase, trigger the first setting module.

Furthermore, the calculating and generating unit is specifically configured to multiply the mnemonic phrase length by the second preset value to generate a mnemonic phrase identification length; obtain the key seed length and the first check value length from the mnemonic phrase identification length according to a preset ratio; generate a random number of the key seed length as the key seed using a real random number generator.

Furthermore, the generating and storing unit is specifically configured to clear data from the security storage, operate hash calculation on the key seed generated by the calculating and generating unit according to the second preset algorithm to obtain a hash value; to take the data of preset length on high-order end of the hash value as the master key, and to store the master key into the security storage.

Furthermore, the equipment further includes:
- a first generating module which is configured to generate an exam term according to the mnemonic phrase obtained by the prompting and generating module and the preset dictionary;
- a displaying and prompting module which is configured to display the exam term generated by the first generating module, to prompt the user to select and to receive the selection information from the user;
- a fourth determining module which is configured to determine whether the selection information, received by the displaying and prompting module from the user, is correct according to the mnemonic word, if yes, to trigger the first setting module; otherwise, to trigger the first generating module.

Furthermore, the displaying and prompting module is specifically configured to display the mnemonic phrase via a displaying screen of the human-computer interaction module, display the exam term generated by the first generating module on the displaying screen, and prompt the user to select via the displaying screen and receive the selection information from the user.

Furthermore, the equipment further includes
- a resetting module which is configured to reset the number of times for user selection in the case that the determination of the fourth determining module is no;
- a determining and updating module which is configured to determine whether the number of times for user selection reaches a preset number of times in the case that the determination of the fourth determining module is yes, if yes, to trigger the first setting module; otherwise, to update the number of times for user selection, and to trigger the first generating module.

Furthermore, the prompting and searching module is specifically configured to prompt the user to input the letter of the word via the displaying screen of the human-computer interaction module, search for the corresponding mnemonic word from the preset dictionary according to the letter in the case that the letter input by the user via the key of the human-computer interaction module is received; to display the found mnemonic word via the displaying screen of the human-computer interaction module and display information that prompts the user to select on the displaying screen, and receive the selection information from the user.

Furthermore, the equipment further includes:
- a prompting and receiving module which is configured to prompt the user to input the mnemonic phrase length in the case that the first determining module determines the operation triggering information is restoring hardware wallet, to trigger the prompting and searching module when the mnemonic phrase length is received;
- the second determining module is specifically configured to determine whether the length of the selection information of the prompting and searching module equals the mnemonic phrase length, if yes, to trigger the obtaining and authenticating module; otherwise, to trigger the prompting and searching module.

Furthermore, the obtaining and authenticating module includes that
- a searching and jointing unit which is configured to clear data from the security storage, search for the mnemonic word identification corresponding to each mnemonic word from the mnemonic phrase preset dictionary, and to joint the found mnemonic word identifications successively to obtain the mnemonic phrase identification;
- a calculating and intercepting unit which is configured to calculate the key seed length according to the mnemonic phrase identification length, intercept data of the key seed length successively from the mnemonic phrase identification to obtain the key seed, and to use the data of the mnemonic phrase identification except the key seed as a second check value;
- a calculating and determining unit which is configured to operate the first preset algorithm on the key seed to obtain the first calculation result, intercept data having a length equal to the second check value from the start bit of the first calculation result to obtain a first comparison value, to determine whether the second check value matches with the first comparison value, if yes, to trigger the storing and setting module; otherwise, to report an error;
- the storing and setting module is specifically configured to generate the master key via the second preset algorithm according to the key seed and to store the master key into the security storage, to set the hardware wallet as initialized, to inform the user that the hardware wallet is initialized successfully via the displaying screen, and the hardware wallet performs normal operation.

Compared to the prior art, the present disclosure has following advantages:

the technical solution of the disclosure realizes that the hardware wallet can be initialized in an off-line state, which makes the hardware wallet safer.

DETAILED DESCRIPTION OF THE EMBODIMENTS

The technical solution in the embodiments of the present application will be described clearly and completely with reference to the drawings of the present application. Apparently, embodiments described herein are just a part of embodiments of the present application. On the basis of the embodiments of the application, all other embodiments made by those skilled in the art without any creative work fall within the protection scope of the application.

Embodiment 1

Figure 1:
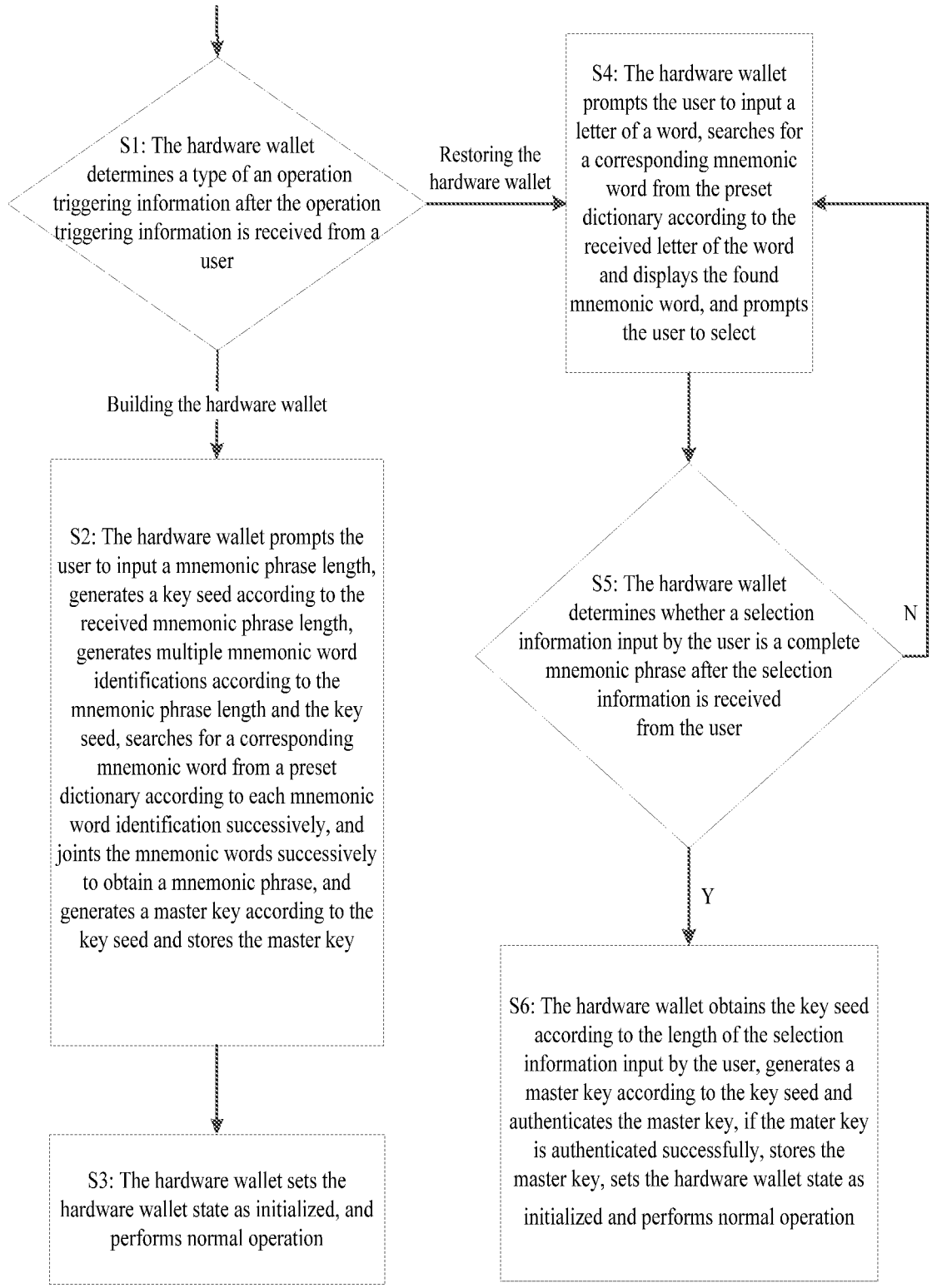
FIG. 1 is a flow chart of a method for realizing offline initialization of a hardware wallet according to Embodiment 1 of the present application.

Embodiment 1 of the present application provides a method for realizing off-line initialization of a hardware wallet, as shown in FIG. 1, including:

Step S1, the hardware wallet determines a type of an operation triggering information after the operation triggering information is received from a user, executes Step S2 if the operation triggering information is building hardware wallet; executes Step S4 if the operation triggering information is restoring hardware wallet.

Preferably, before Step S1, the method further includes that the hardware wallet powers on, determines whether the hardware wallet is initialized, if yes, the hardware wallet performs normal operation; otherwise, executes Step S1.

In which, determining whether the hardware wallet is initialized specifically includes that the hardware wallet determines whether the hardware wallet is initialized according to a hardware wallet state, the hardware wallet performs normal operation if the hardware wallet state is initialized; otherwise, executes Step S1.

Step S2, the hardware wallet prompts the user to input a mnemonic phrase length, generates a key seed according to the received mnemonic phrase length, generates multiple mnemonic word identifications according to the mnemonic phrase length and the key seed, searches for a corresponding mnemonic word from a preset dictionary according to each mnemonic word identification successively, and joints the mnemonic words successively to obtain a mnemonic phrase, and generates a master key according to the key seed and stores the master key.

Step S3, the hardware wallet sets the hardware wallet state as initialized, and performs normal operation.

Step S4, the hardware wallet prompts the user to input a letter of a word, searches for a corresponding mnemonic word from the preset dictionary according to the received letter of the word and displays the found mnemonic word, and prompts the user to select.

Step S5, the hardware wallet determines whether a selection information input by the user is a complete mnemonic phrase after the selection information is received from the user, if yes, executes Step S6; otherwise, returns to Step S4.

Step S6, the hardware wallet obtains the key seed according to the length of the selection information input by the user, generates a master key according to the key seed and authenticates the master key, if the master key is authenticated successfully, stores the master key, sets the hardware wallet state as initialized and performs normal operation.

In Embodiment 1, in Step S6, the hardware wallet reports an error if the master key is authenticated unsuccessfully.

Optionally, in Embodiment 1, between Step S1 and Step S2, the method includes that the hardware wallet informs the user of setting an identity authentication way, executes Step S2 if the identity authentication way is set successfully; otherwise, reports an error.

Between Step S1 and Step S4, the method further includes that the hardware wallet informs the user of setting the identity authentication way, executes Step S4 if the identity authentication way is set successfully; otherwise, reports an error.

In Embodiment 1, the identity authentication way includes but is not limited to PIN code, fingerprint, iris and the like; more details will be described by taking PIN code as an example.

Specifically, the hardware wallet informing the user of setting the PIN code includes:

Step A1, the hardware wallet prompts the user to set the PIN code, determines whether the PIN code is legitimate after the PIN code input by the user is received, if yes, executes Step A2; otherwise, returns to Step A1.

Optionally, the determining whether the PIN code is legitimate specifically is determining whether a length of the PIN code is within a preset scope, if yes, the PIN code is legitimate; otherwise, the PIN code is illegitimate;

Before returning to Step A1 in the case that the hardware wallet determines the PIN code is illegitimate in Step A1, the method further includes that the hardware wallet determines whether a number of times of setting PIN code incorrectly reaches the preset number of times, if yes, reports an error, and returns to Step S1; otherwise, updates the number of times of setting PIN code incorrectly, and returns to Step A1.

Step A2, the hardware wallet determines a number of times of inputting legitimate PIN code, executes Step A3 if the number of times of inputting legitimate PIN code is two; updates the number of times of inputting legitimate PIN code by the user and returns to Step A1 if the number of times of inputting legitimate PIN code is one; reports an error if the number of times of inputting legitimate PIN code is three.

Step A3, the hardware wallet determines whether the legitimate PIN codes received for two times are identical, if yes, the user identity is authenticated successfully; otherwise, returns to Step S1.

Embodiment 2

Figure 2A:
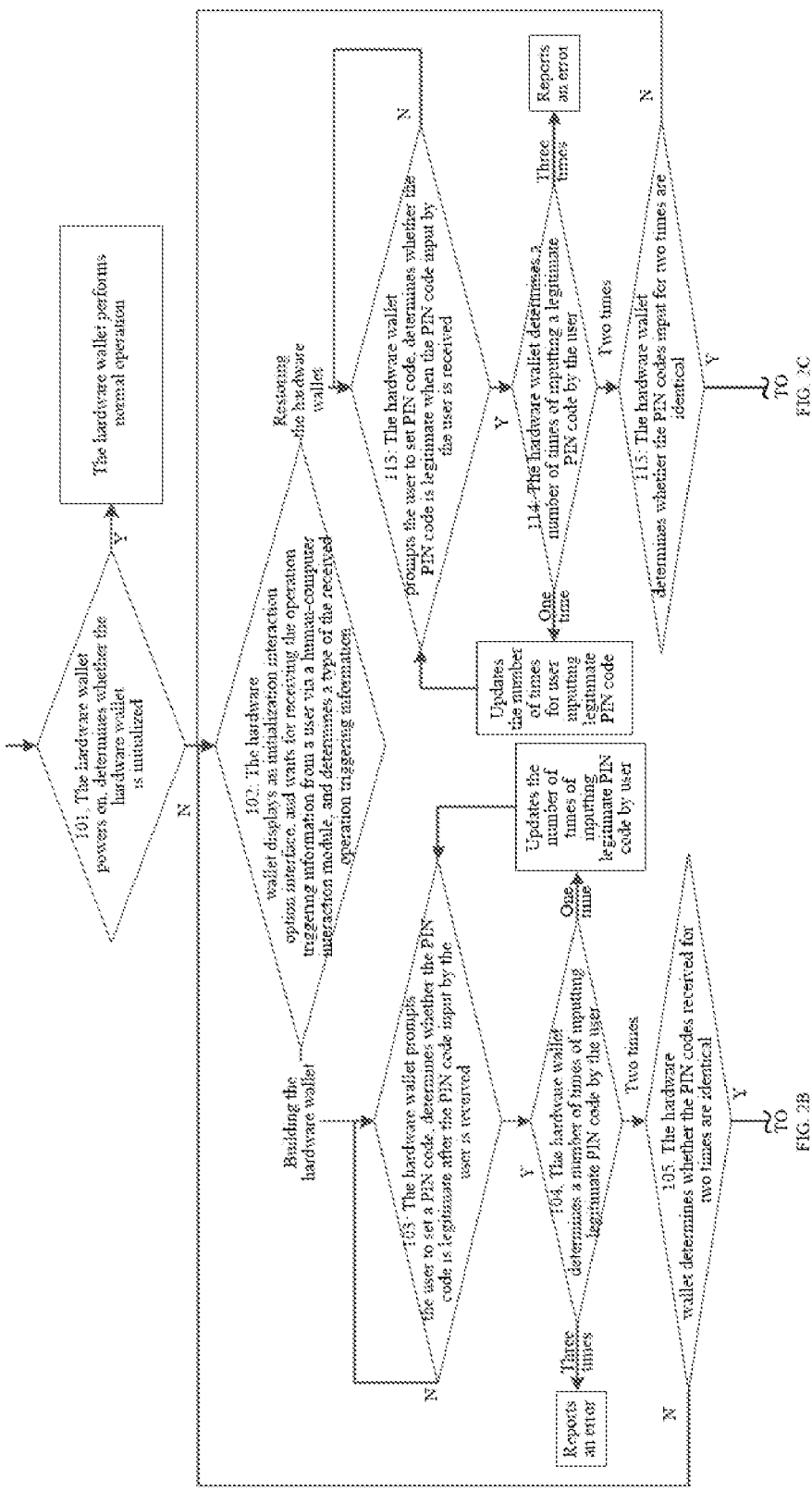
FIGS. 2A to 2C are a flow chart of a method for realizing offline initialization of a hardware wallet according to Embodiment 2 of the present application.
Figure 2B:
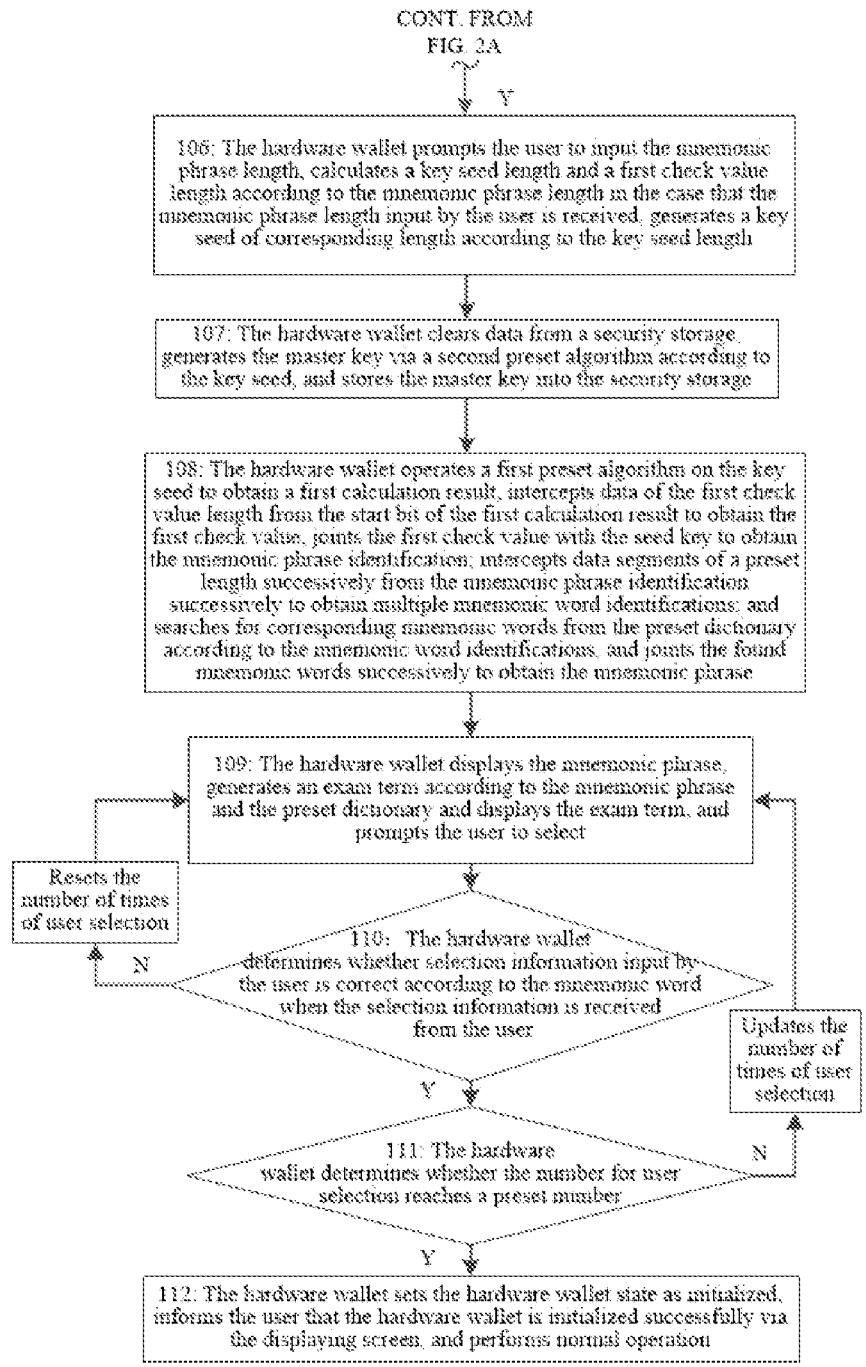
Figure 2C:
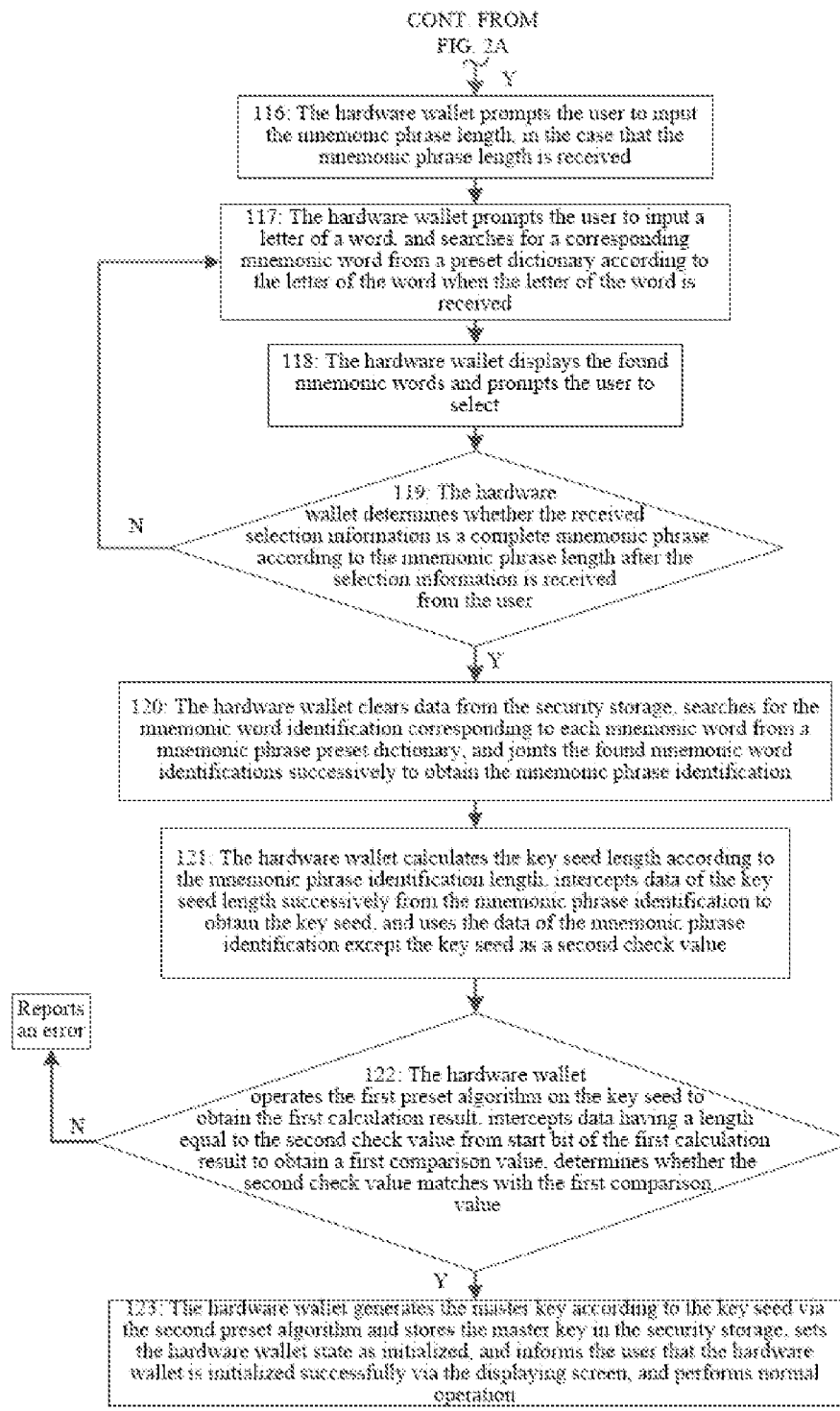

Embodiment 2 of the present application provides a method for realizing off-line initialization of a hardware wallet, as shown in FIGS. 2A to 2C, including:

Step 101, the hardware wallet powers on, determines whether the hardware wallet is initialized, if yes, the hardware wallet performs normal operation; otherwise, executes Step 102.

Optionally, in Embodiment 2, the hardware wallet determines whether the hardware wallet is initialized according to a hardware wallet state, executes Step 124 if the hardware wallet state is initialized; otherwise, executes Step 102.

Step 102, the hardware wallet displays an initialization interaction option interface, and waits for receiving the operation triggering information from a user via a human-computer interaction module, and determines a type of the received operation triggering information, executes Step 103 if the operation triggering information is building hardware wallet; executes Step 113 if the operation triggering information is restoring hardware wallet.

In Embodiment 2, the human-computer interaction module includes a key and a displaying screen; the hardware wallet displays the initialization interaction option interface via the displaying screen, and the user inputs the operation triggering information via the key and the screen.

Step 103, the hardware wallet prompts the user to set a PIN code, determines whether the PIN code is legitimate after the PIN code input by the user is received, if yes, executes Step 104; otherwise, returns to Step 103.

Specifically, Step 103 includes that the hardware wallet prompts the user to set the PIN code via the displaying screen of the human-computer interaction module, determines whether the PIN code is legitimate in the case that the PIN code input by the user through the key of the human-computer interaction module is received, if yes, executes Step 104; otherwise, returns to Step 103.

In Embodiment 2, determining whether the PIN code is legitimate specifically includes: determining whether a length of the PIN code is within a preset scope, if yes, the PIN code is legitimate; otherwise, the PIN code is illegitimate.

Preferably, in the case of determining that the PIN code is illegitimate in Step 103, before returning to Step 103, the method further includes that: the hardware wallet determines whether a number of times of setting PIN code incorrectly reaches a preset number of times, if yes, displays error information via the displaying screen, and returns to Step 102; otherwise, updates the number of times of setting PIN code incorrectly, and returns to Step 103.

For instance, updating the number of times of setting PIN code incorrectly can be updating the number of times of setting PIN code incorrectly to be the number of times of setting PIN code incorrectly plus 1.

Step 104, the hardware wallet determines a number of times of inputting legitimate PIN code by the user, executes Step 105 if the number of times of inputting legitimate PIN code by the user is two; updates the number of times of inputting legitimate PIN code by the user and returns to Step 103 if the number of times of inputting legitimate PIN code by the user is one; and reports an error if the number of times of inputting legitimate code by the user is three.

Specifically, in Embodiment 2, reporting an error can be displaying error information via the displaying screen; for instance, updating the number of times of inputting legitimate PIN code by the user can be updating the number of times of inputting legitimate PIN code by the user to be the number of times of inputting legitimate PIN code by the user plus 1.

Step 105, the hardware wallet determines whether the PIN codes received for two times are identical, if yes, executes Step 106; otherwise, returns to Step 102.

Step 106, the hardware wallet prompts the user to input the mnemonic phrase length, calculates a key seed length and a first check value length according to the mnemonic phrase length in the case that the mnemonic phrase length input by the user is received, generates a key seed of corresponding length according to the key seed length.

Preferably, the key seed in Embodiment 2 is a random number; the hardware wallet prompts the user to input the mnemonic phrase length via the displaying screen of the human-computer interaction module.

Optionally, the mnemonic phrase length specifically is a number of mnemonic words included in the mnemonic phrase, for instance, the mnemonic phrase length may be 12 or 15 or 18 or 21 or 24.

Specifically, the hardware wallet multiples the mnemonic phrase length by a second preset value to generate a mnemonic phrase identification length; obtains the key seed length and the first check value length from the mnemonic phrase length according to a preset ratio.

In Embodiment 2, the second preset value is a bit number of the mnemonic word identification in the preset dictionary of each mnemonic word in the mnemonic phrase; for instance, the second preset value is 11 bit, the mnemonic phrase length is 24, thus the obtained mnemonic phrase identification length is 264 bit.

Due to the mnemonic phrase identification length=the key seed length+the first check value length, and the preset ration of the key seed length and the first check value length is 32, according to the above relation, the key seed length and the first check value length can be obtained according to the mnemonic phrase identification length; in Embodiment 2, the key seed length is 256 bit, and the first check value length is 8 bit.

And then, the hardware wallet generates a random number of the key seed length which is 256 bit by using a real random number generator, and uses the random number as the key seed.

Step 107, the hardware wallet clears data from a security storage, generates the master key via a second preset algorithm according to the key seed, and stores the master key into the security storage.

Specifically, generating the master key via the second preset algorithm according to the key seed in Step 107 specifically is: operating hash calculation on the key seed according to the second preset algorithm to obtain a hash value; and taking data of a preset length on a high-order end of the hash value as the master key.

In Embodiment 2, the second preset algorithm preferably is HMAC-SHA512 algorithm.

In Embodiment 2, the data of the preset length on the high-order end bits preferably is the data on the high 256 bits, the data of preset length on the low-order end bits preferably is the data on the low 256 bits.

Step 108, the hardware wallet operates a first preset algorithm on the key seed to obtain a first calculation result, intercepts data of the first check value length from the start bit of the first calculation result to obtain the first check value, joints the first check value with the seed key to obtain the mnemonic phrase identification; intercepts data segments of a preset length successively from the mnemonic phrase identification successively to obtain multiple mnemonic word identifications; and searches for corresponding mnemonic words from the preset dictionary according to the mnemonic word identifications, and joints the found mnemonic words successively to obtain the mnemonic phrase.

For instance, there are 2048 words in the preset dictionary in Embodiment 2.

Preferably, the building hardware wallet instruction further includes a language type; the language type specifically includes: Simplified Chinese, Traditional Chinese and English.

Preferably, in Embodiment 2, the sequence of Step 107 and Step 108 can be exchanged.

Step 109, the hardware wallet displays the mnemonic phrase, generates an exam term according to the mnemonic phrase and the preset dictionary and displays the exam term, and prompts the user to select.

In Embodiment 2, Step 109 specifically includes that the hardware wallet displays the mnemonic phrase via the displaying screen of the human-computer interaction module, generates the exam term according to a subject phrase and the preset dictionary and displays the exam term on the displaying screen, and prompts the user to select via the displaying screen.

Step 110, the hardware wallet determines whether the selection information input by the user is correct according to the mnemonic word when the selection information is received from the user, if yes, executes Step 111; otherwise, resets a number of times for user selection, and returns to Step 109.

For instance, the initial value of the number of times for user selection in this embodiment is zero.

Step 111, the hardware wallet determines whether the number of times for user selection reaches a preset number, if yes, executes step 112, otherwise updates the number of times for user selection, and returns to step 109.

For instance, updating the number of times for user selection in Embodiment 2 can be the number of times for user selection plus 1.

Step 112, the hardware wallet sets the hardware wallet state as initialized, informs the user that the hardware wallet is initialized successfully via the displaying screen, and performs normal operation.

Step 113, the hardware wallet prompts the user to set PIN code, determines whether the PIN code is legitimate when the PIN code input by the user is received, if yes, executes Step 114; otherwise, returns to Step 113.

Specifically, Step 113 includes that the hardware wallet prompts the user to set the PIN code via the displaying screen of the human-computer interaction module, and determines whether the PIN code is legitimate when the PIN code input by the user via the displaying screen of the human-computer interaction module is received, if yes, executes Step 114; otherwise, returns to Step 113.

In Embodiment 2, determining whether the PIN code is legitimate specifically is: determining whether a length of the PIN code is within a preset scope, if yes, the PIN code is legitimate; otherwise, the PIN code is illegitimate.

Preferably, in the case of determining that the PIN code is illegitimate in Step 113, before returning to Step 113, the method further includes that the hardware wallet determines whether the number of times of setting PIN code incorrectly reaches a preset number, if yes, displays error information via the displaying screen, and returns to Step 102; otherwise, updates the number of times of setting PIN code incorrectly, and returns to Step 113.

For instance, updating the number of times for setting PIN code incorrectly can be the number of times of setting PIN code incorrectly plus 1.

Step 114, the hardware wallet determines a number of times of inputting a legitimate PIN code by the user, executes Step 115 in the case that the number of times is two; updates the number of times of inputting a legitimate PIN code by the user and returns to Step 113 in the case that the number of times is one; reports an error in the case that the number of times is three.

Specifically, reporting an error in Embodiment 2 can be displaying error information via the displaying screen; for instance, updating the number of times of inputting a legitimate PIN code by the user can be updating the number of times for of inputting a legitimate PIN code by the user to be the number of times of inputting a legitimate PIN code by the user plus 1.

Step 115, the hardware wallet determines whether the PIN codes input for two times are identical, if yes, executes Step 116; otherwise, returns to Step 101.

Step 116, the hardware wallet prompts the user to input the mnemonic phrase length, and executes Step 117 in the case that the mnemonic phrase length is received.

In Embodiment 2, Step 116 specifically is that the hardware wallet prompts the user to input the mnemonic phrase length via the displaying screen of the human-computer interaction module.

Step 117, the hardware wallet prompts the user to input a letter of a word, and searches for a corresponding mnemonic word from a preset dictionary according to the letter of the word when the letter of the word is received.

In Embodiment 2, Step 117 specifically is that the hardware wallet prompts the user to input the letter of the word via the displaying screen of the human-computer interaction module, in the case that the letter input by the user via a key of the human-machine interacting module is received, the hardware wallet searches for the corresponding mnemonic word from the preset dictionary according to the letter of the word.

Step 118, the hardware wallet displays the found mnemonic words and prompts the user to select.

Specifically, in Embodiment 2, the hardware wallet displays the found mnemonic words via the displaying screen of the human-computer interaction module and displays information of prompting the user to select on the displaying screen.

Step 119, the hardware wallet determines whether the received selection information is a complete mnemonic phrase according to the mnemonic phrase length after the selection information is received from the user, if yes, executes Step 120; otherwise, returns to Step 117.

Specifically, the hardware wallet determines whether the length of the received selection information equals the mnemonic phrase length, if yes, it is a complete mnemonic phrase; otherwise, it is not a complete mnemonic phrase.

Step 120, the hardware wallet clears data from the security storage, searches for the mnemonic word identification corresponding to each mnemonic word from a mnemonic phrase preset dictionary, and joints the found mnemonic word identifications successively to obtain the mnemonic phrase identification.

Step 121, the hardware wallet calculates the key seed length according to the mnemonic phrase identification length, intercepts data of the key seed length successively from the mnemonic phrase identification to obtain the key seed, and uses the data of the mnemonic phrase identification except the key seed as a second check value.

Step 122, the hardware wallet operates the first preset algorithm on the key seed to obtain the first calculation result, intercepts data having a length equal to the second check value from start bit of the first calculation result to obtain a first comparison value, determines whether the second check value matches with the first comparison value, if yes, executes Step 123; otherwise, reports an error.

Step 123, the hardware wallet generates the master key according to the key seed via the second preset algorithm and stores the master key in the security storage, sets the hardware wallet state as initialized, and informs the user that the hardware wallet is initialized successfully via the displaying screen, and performs normal operation.

Embodiment 3

Figure 3:
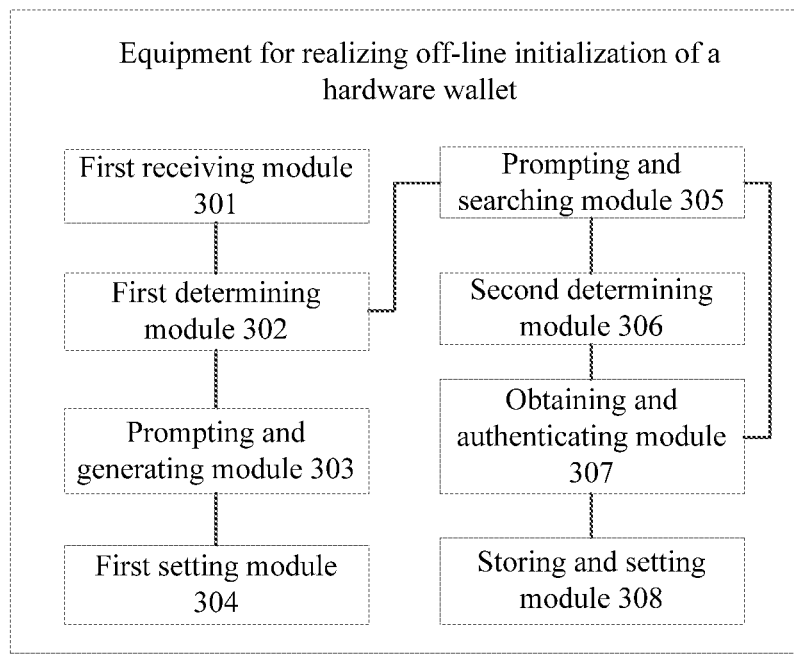
FIG. 3 is a block diagram of an equipment for realizing offline initialization of a hardware wallet according to Embodiment 3 of the present application.

Embodiment 3 of the present application provides an equipment for realizing off-line initialization of a hardware wallet, as shown in FIG. 3, including:
- a first receiving module 301 which is configured to receive operation triggering information from a user;
- a first determining module 302 which is configured to determine a type of the operation triggering information received by the first receiving module 301, to trigger a prompting and generating module 303 if the operation triggering information is building hardware wallet; to trigger a prompting and searching module 305 if the operation triggering information is restoring hardware wallet;
- the prompting and generating module 303 which is configured to prompt a user to input a mnemonic phrase length, and generate a key seed according to the received mnemonic phrase length, generate multiple mnemonic word identifications according to the mnemonic phrase length and the key seed, search for a corresponding mnemonic word from a preset dictionary according to each mnemonic word identification successively, and joint the found mnemonic words successively to obtain a mnemonic phrase, and generate a master key according to the key seed and store the master key, and trigger a first setting module 304;
- the first setting module 304 which is configured to set the hardware wallet state as initialized, and the hardware wallet performs normal operation;
- the prompting and searching module 305 which is configured to prompt the user to input a letter of a word, search for a corresponding mnemonic word from the preset dictionary according to the received letter and display the found mnemonic word, prompt the user to select, and receive selection information from the user;
- a second determining module 306 which is configured to determine whether the selection information received by the prompting and searching module is a complete mnemonic phrase, if yes, to trigger a obtaining and authenticating module 307; otherwise, to trigger the prompting and searching module 305;
- the obtaining and authenticating module 307 which is configured to obtain the key seed according to the length of the selection information input by the user, and generate a master key according to the key seed and authenticate the master key;
- a storing and setting module 308 which is configured to store the master key after the master key is authenticated successfully by the obtaining and authenticating module 307, and to set the state of the hardware wallet as initialized, and then the hardware wallet performs normal operation.

Optionally, the equipment in Embodiment 3 further includes:
- a third determining module which is configured to determine whether the hardware wallet is initialized after the hardware wallet powers on, if yes, the hardware wallet performs normal operation; otherwise, to trigger the first receiving module 301.

In which, the third determining module is specifically configured to determine whether the hardware wallet is initialized according to the hardware wallet state after the hardware wallet powers on, the hardware wallet performs normal operation if the hardware wallet is initialized; otherwise, to trigger the first receiving module 301.

In Embodiment 3, the first receiving module 301 is specifically configured to display an initialization interaction option surface, and wait for receiving the operation triggering information sent by the user via a human-computer interaction module.

Optionally, the equipment in Embodiment 3 further includes that
- a second setting module which is configured to inform the user of setting an identity authentication way when the first determining module 302 determines that the operation triggering information is building hardware wallet, and to trigger the prompting and generating module 303 in the case that the identity authentication way is set successfully; and is further configured to inform the user of setting the identity authentication way when the first determining module 302 determines that the operation triggering information is restoring hardware wallet, and to trigger the prompting and searching module 305 if the identity authentication way is set successfully, and to report an error if the identity authentication way is set unsuccessfully.

In which, the second setting module is specifically configured to inform the user of setting a PIN code in the case that the first determining module 302 determines that the operation triggering information is building hardware wallet, and to trigger the prompting and generating module 303 if the PIN code is set successfully; and is further configured to inform the user of setting the PIN code in the case that the first determining module 302 determines that the operation triggering information is restoring hardware wallet, and to trigger the prompting and searching module 305 if the PIN code is set successfully; to report an error if the PIN code is set unsuccessfully.

Furthermore, the second setting module includes:
- a first prompting and receiving unit which is configured to prompt the user to set the PIN code, and to receive the PIN code input by the user;
- a first determining unit which is configured to determine whether the PIN code is legitimate after the first prompting and receiving unit receives the PIN code input by the user, if yes, to trigger a second determining unit; otherwise, to trigger the first prompting and receiving unit;
- preferably, the first determining unit is specifically configured to determine whether the length of the PIN code is within a preset scope in the case that the first prompting and receiving unit receives the PIN code input by the user, if yes, the PIN code is legitimate, and to trigger the second determining unit; otherwise, the PIN code is illegitimate, and to trigger the first prompting and receiving unit;
- the second determining unit which is configured to determine a number of times of inputting legitimate PIN code by the user, to trigger a third determining unit in the case that the number of times of inputting legitimate PIN code is two; to update the number of times of inputting legitimate PIN code by the user and to trigger the first prompting and receiving unit in the case that the number of times is one; to report error in the case that the number of times is three;

the third determining unit which is configured to determine whether the legitimate PIN codes received for two times are identical, if yes, the user identity is authenticated successfully, and to trigger the prompting and generating module 303 or the prompting and searching module 305; otherwise, to trigger the first prompting and receiving unit.

Optionally, the second setting module further includes:
a fourth determining unit which is configured to determine whether a number of times of setting PIN code incorrectly reaches a preset number of times when the first determining unit determines that the PIN code is illegitimate, if yes, report an error, and trigger the first receiving module 301; otherwise, update the number of times of setting PIN code incorrectly, and trigger the first prompting and receiving unit.

In Embodiment 3, the prompting and generating module 303 includes:
a second prompting and receiving unit which is configured to prompt the user to input the mnemonic phrase length, and to receive the mnemonic phrase length input by the user;
a calculating and generating unit which is configured to calculate a key seed length and a first check value according to the mnemonic phrase length received by the second prompting and receiving unit, and to generate a key seed of corresponding length according to the key seed length;
furthermore, the calculating and generating unit is specifically configured to generate the mnemonic phrase identification length by multiplying the mnemonic phrase length by the second preset value; and to obtain the key seed length and the first check value length from the mnemonic phrase identification length according a preset ratio; and to generate a random number of the key seed length by using a real random number generator and make the random number as the key seed;
a generating and storing unit which is configured to clear data from the security storage, and generate the master key according to the key seed generated by the calculating and generating unit via a second preset algorithm, and store the master key in the security storage;
furthermore, the generating and storing unit is specifically configured to clear the data from the security storage, and operate hash calculation on the key seed generated by the calculating and generating unit according to the second preset algorithm to obtain a hash value; and take the data of preset length on the high-order end of the hash value as the master key, and store the master key in the security storage;
a calculating and jointing unit which is configured to operate a first preset algorithm on the key seed to obtain a first calculation result, and intercept data of a first check value length from the start bit of the first calculation result to obtain the first check value, and joint the first check value with the key seed to obtain the mnemonic phrase identification; and intercept data of preset length from mnemonic phrase identification successively to obtain multiple mnemonic word identifications; and search for corresponding mnemonic words from the preset dictionary according to the mnemonic word identifications, and joint the found mnemonic words successively to obtain the mnemonic phrase.

Optionally, the equipment in Embodiment 3 further includes:

a first generating module which is configured to generate an exam term according to the mnemonic phrase obtained by the prompting and generating module 303 and the preset dictionary;
a displaying and prompting module which is configured to display the exam term generated by the first generating module, and prompt the user to select and receive the selection information from the user;
furthermore, the displaying and prompting module is specifically configured to display the mnemonic phrase via the displaying screen of the human-computer interaction module, and display the exam term generated by the first generating module on the displaying screen, and prompt the user to select via the displaying screen and receive the selection information from the user;
a fourth determining module which is configured to determine whether the selection information received by the displaying and prompting module from the user, is correct according to the mnemonic word, if yes, to trigger the first setting module 304; otherwise, to trigger the first generating module.

Optionally, the equipment in Embodiment 3 further includes that
a resetting module which is configured to reset the number of times of selecting by the user in the case that the determination of the fourth determining module is no;
a determining and updating module which is configured to determine whether the number of times of selecting by the user reaches a preset number of times in the case that the determination of the fourth determining module is yes, if yes, to trigger the first setting module 304; otherwise, to update the number of times for user selection, and to trigger the first generating module.

Preferably, the prompting and searching module 305 in Embodiment 3 is specifically configured to prompt the user to input the letter of the word via the displaying screen of the human-computer interaction module, to search for a corresponding mnemonic word from the preset dictionary when the letter input by the user via the key of the human-computer interaction module is received; to display the found mnemonic word via the displaying screen of the human-computer interaction module and to display information which prompts the user to select on the displaying screen, and to receive the selection information from the user.

Optionally, the equipment in Embodiment 3 further includes:
a prompting and receiving module which is configured to prompt the user to input the mnemonic phrase length in the case that the first determining module 302 determines that the operation triggering information is restoring hardware wallet, and to trigger the prompting and searching module 305 in the case that the length of the mnemonic phrase is received;
the second determining module 307 is specifically configured to determine whether the length of the selection information of the prompting and searching module 305 equals the length of the mnemonic phrase, if yes, to trigger the obtaining and authenticating module 307; otherwise, to trigger the prompting and searching module 305.

Preferably, the obtaining and authenticating module 307 in Embodiment 3 includes:
a searching and jointing unit which is configured to clear data from the security storage, search for the mnemonic word identification corresponding to each mnemonic word from the mnemonic phrase preset dictionary, joint found mnemonic word identifications successively to obtain the mnemonic phrase identification;

a calculating and intercepting unit which is configured to calculate the key seed length according to the mnemonic phrase identification length, intercept data of the key seed length successively from the mnemonic phrase identification to obtain the key seed, and to use the data of the mnemonic phrase identification except the key seed as the second check value;

a calculating and determining unit which is configured to operate the first preset algorithm on the key seed to obtain the first calculation result, intercept data having a length equal the second check value, from the start bit of the first calculation result to obtain a first comparison value, determine whether the second check value matches with the first comparison value, if yes, to trigger the storing and setting module; otherwise, to report an error;

the storing and setting module is specifically configured to generate the master key via the second preset algorithm according to the key seed and store the master key into the security storage, set the hardware wallet state as initialized, inform the user that the hardware wallet is initialized successfully via the displaying screen, and the hardware wallet performs normal operation.

The technological solution provided by the present disclosure realizes that the hardware wallet can be initialized in the off-line state, which makes the hardware wallet safer.

The above are only preferred embodiments of the present application while the protection scope of the present application is not limited thereto. Any modifications, changes or replacements that can be easily thought of by those skilled in the art within the technical scope disclosed by the present application should be covered within the scope of the present application. Therefore, the protection scope of the present application should be subject to the appended claims.

The invention claimed is:

1. A method for realizing off-line initialization of a hardware wallet, comprising:

determining, by a hardware wallet, a type of an operation triggering information after the operation triggering information is received by the hardware wallet from a user, wherein the type of the operation triggering information comprises building hardware wallet or restoring hardware wallet, and the hardware wallet is in an off-line state;

in response to determining that the type of the operation triggering information is the building hardware wallet, prompting, by the hardware wallet, the user to input a mnemonic phrase length, wherein the mnemonic phrase length is a number of mnemonic words comprised in a mnemonic phrase; multiplying, by the hardware wallet, the mnemonic phrase length by a second preset value to generate a mnemonic phrase identification length; obtaining a key seed length and a first check value length from the mnemonic phrase identification length according to a preset ratio, generating a key seed of corresponding length according to the key seed length; generating multiple mnemonic word identifications according to the mnemonic phrase length and the key seed, searching for a corresponding mnemonic word from a preset dictionary according to each mnemonic word identification successively, jointing the mnemonic words successively to obtain the mnemonic phrase, and generating a master key according to the key seed and storing the master key;

in response to determining that the type of the operation triggering information is the restoring hardware wallet, prompting, by the hardware wallet, the user to input a letter of a word, searching for a corresponding mnemonic word from the preset dictionary according to the received letter of the word and displaying the found mnemonic word, and prompting the user to select;

in response to determining selection information input by the user is a complete mnemonic phrase after the selection information is received from the user, obtaining, by the hardware wallet, the key seed according to a length of the selection information input by the user, generating the master key according to the key seed, and authenticating the master key, after the master key is authenticated successfully, storing the master key; in response to determining the selection information input by the user is not a complete mnemonic phrase, returning to the prompting, by the hardware wallet, the user to input the letter of the word;

after storing the master key, setting a hardware wallet state as initialized, and performing normal operation;

before the determining, by the hardware wallet, the type of the operation triggering information after the operation triggering information is received by the hardware wallet from the user, the method comprises:

powering on, by the hardware wallet, and determining whether the hardware wallet is initialized;

in response to determining the hardware wallet is initialized, performing normal operation; in response to determining the hardware wallet is not initialized, determining, by the hardware wallet, the type of the operation triggering information after the operation triggering information is received by the hardware wallet from the user;

the determining, by the hardware wallet, the type of the operation triggering information after the operation triggering information is received by the hardware wallet from the user comprises:

displaying, by the hardware wallet, an initialization interaction option interface, waiting for receiving the operation triggering information sent from the user via a human-computer interaction module, wherein the initialization interaction option interface comprises a first option for building the hardware wallet and a second option for restoring hardware wallet; and determining the type of the operation triggering information as the building hardware wallet in response to the first option is triggered, or determining the type of the operation triggering information as the restoring hardware wallet in response to the second option is triggered.

2. The method as claimed in claim 1, wherein between the determining, by the hardware wallet, the type of the operation triggering information after the operation triggering information is received by the hardware wallet from the user and the prompting, by the hardware wallet, the user to input the mnemonic phrase length, the method comprises:

informing, by the hardware wallet, the user of setting a PIN code, prompting, by the hardware wallet, the user to input the mnemonic phrase length in response to the PIN code is set successfully; otherwise, reporting an error; and between the determining, by the hardware wallet, the type of the operation triggering information after the operation triggering information is received by the hardware wallet from the user and the prompting, by the hardware wallet, the user to input the letter of the word, the method comprises:

informing, by the hardware wallet, the user of setting the PIN code, prompting, by the hardware wallet, the user to input the letter of the word in response to the PIN code is set successfully; otherwise, reporting an error.

3. The method as claimed in claim 1, wherein, the generating multiple mnemonic word identifications according to the mnemonic phrase length and the key seed, searching for the corresponding mnemonic word from the preset dictionary according to each mnemonic word identification successively, jointing the mnemonic words successively to obtain the mnemonic phrase, and generating the master key according to the key seed and storing the master key comprises:

clearing, by the hardware wallet, data in a security storage, generating the master key according to the key seed via a second preset algorithm, and storing the master key into the security storage; and operating, by the hardware wallet, a first preset algorithm on the key seed to obtain a first calculation result, intercepting data of a first check value length from a start bit of the first calculation result to obtain the first check value, jointing the first check value with the key seed to obtain a mnemonic phrase identification; intercepting data segments of preset length successively from the mnemonic phrase identification to obtain multiple mnemonic word identifications; searching for corresponding mnemonic words from the preset dictionary according to the mnemonic word identifications, and jointing the found mnemonic words successively to obtain the mnemonic phrase.

4. The method as claimed in claim 3, wherein the generating the master key according to the key seed via the second preset algorithm comprises:

operating hash calculation on the key seed according to the second preset algorithm to obtain a hash value; taking data of preset length on high-order end of the hash value as the master key.

5. The method as claimed in claim 1, wherein
the generating the key seed of corresponding length according to the key seed length comprises: generating, by the hardware wallet, a random number of the key seed length as the key seed by using a real random number generator.

6. The method as claimed in claim 1, wherein between the prompting, by the hardware wallet, the user to input the mnemonic phrase length and the setting the hardware wallet state as initialized, and performing normal operation, the method comprises:

generating and displaying, by the hardware wallet, an exam term according to the mnemonic phrase and the preset dictionary, and prompting the user to select; and in response to determining the selection information input by the user is correct according to the mnemonic word after receiving the selection information from the user, setting the hardware wallet state as initialized, and performing normal operation; in response to determining the selection information input by the user is not correct, returning to the generating and displaying, by the hardware wallet, the exam term according to the mnemonic phrase and the preset dictionary, and prompting the user to select.

7. The method as claimed in claim 6, wherein the generating and displaying, by the hardware wallet, the exam term according to the mnemonic phrase and the preset dictionary, and prompting the user to select comprises: displaying, by the hardware wallet, the mnemonic phrase via a displaying screen of human-computer interaction module, generating the exam term according to a subject phrase and the preset dictionary and displaying the exam term on the displaying screen, and prompting the user to select via the displaying screen.

8. The method as claimed in claim 1, wherein the prompting, by the hardware wallet, the user to input the letter of the word, searching for the corresponding mnemonic word from the preset dictionary according to the received letter of the word and displaying the found mnemonic word, and prompting the user to select comprises: prompting, by the hardware wallet, the user to input the letter of the word via the displaying screen of human-computer interaction module, searching for the corresponding mnemonic word from the preset dictionary according to the letter after receiving the letter input by the user via a key of the human-computer interaction module; displaying, by the hardware wallet, the found mnemonic word via the displaying screen of the human-computer interaction module and displaying information of prompting the user to select on the displaying screen.

9. An equipment for realizing off-line initialization of a hardware wallet, comprising:

at least one processor; and
a memory in communicational connection with the at least one processor; wherein,
the memory stores instructions executable by the at least one processor, and the instructions are executed by the at least one processor to enable the at least one processor to perform following steps:

receiving operation triggering information from a user;
determining a type of the operation triggering information received by the hardware wallet, wherein the type of the operation triggering information comprises building hardware wallet or restoring hardware wallet, and the hardware wallet is in an off-line state;

in response to determining that the type of the operation triggering information is the building hardware wallet, prompting the user to input a mnemonic phrase length, wherein the mnemonic phrase length is a number of mnemonic words comprised in a mnemonic phrase; multiplying the mnemonic phrase length by a second preset value to generate a mnemonic phrase identification length; obtaining a key seed length and a first check value length from the mnemonic phrase identification length according to a preset ratio, generating a key seed of corresponding length according to the key seed length; generating multiple mnemonic word identifications according to the mnemonic phrase length and the key seed, searching for a corresponding mnemonic word according to each mnemonic word identification successively from a preset dictionary, and jointing the found mnemonic words successively to obtain the mnemonic phrase, generating a master key according to the key seed and storing the master key;

in response to determining that the type of the operation triggering information is the restoring hardware wallet, prompting the user to input a letter of a word, searching for a corresponding mnemonic word from the preset dictionary according to the received letter and displaying the found mnemonic word, prompting the user to select, and receiving selection information from the user;

in response to determining the selection information received by the equipment is a complete mnemonic phrase, obtaining the key seed according to a length of the selection information input by the user, generating the master key according to the key seed, and authenticating the master key, after the master key is authenticated successfully, storing the master key; in response to determining the selection information input by the user is not a complete mnemonic phrase, returning to the prompting the user to input the letter of the word; and after storing the master key, setting a hardware wallet state as initialized, and performing normal operation;

wherein the at least one processor is further enabled to perform a step of determining whether the hardware wallet is initialized after the hardware wallet powers on, in response to determining the hardware wallet is initialized, the at least one processor is enabled to perform normal operation;

in response to determining the hardware wallet is not initialized, the at least one processor is enabled to perform the step of determining the type of the operation triggering information received by the hardware wallet; and the at least one processor is enabled to: display an initialization interaction option interface, wait for receiving the operation triggering information sent from the user, wherein the initialization interaction option interface comprises a first option for building the hardware wallet and a second option for restoring hardware wallet; and determine the type of the operation triggering information as the building hardware wallet in response to the first option is triggered, or determining the type of the operation triggering information as the restoring hardware wallet in response to the second option is triggered.

10. The equipment as claimed in claim 9, wherein the at least one processor is further enabled to:

inform the user of setting a PIN code in response to the operation triggering information is building hardware wallet; prompt the user to input the mnemonic phrase length in response to the PIN code is set successfully; and is further enabled to inform the user of setting the PIN code in response to the operation triggering information is restoring hardware wallet and prompt the user to input a letter of a word in response to the PIN code is set successfully; report an error in response to the identity authentication way is set unsuccessfully.

11. The equipment as claimed in claim 9, wherein the at least one processor is further enabled to perform following steps:

clearing data in a security storage area, generating the master key according to the key seed generated by the equipment via a second preset algorithm, and storing the master key into the security storage area; and calculating on the key seed via the first preset algorithm to obtain the first calculation result, intercepting data, whose length is equal to the first check value, from the start of the first calculation result to obtain the first check value, jointing the first check value after the key seed to obtain the mnemonic phrase identification; intercepting data of preset length from the mnemonic phrase identification to obtain multiple of mnemonic word identification; searching for a mnemonic word corresponding to each mnemonic word identification from the preset dictionary, jointing the found mnemonic words successively to obtain the mnemonic phrase, and setting the hardware wallet state as initialized, and performing normal operation.

12. The equipment as claimed in claim 11, wherein the at least one processor is enabled to clear data from the security storage area, operate hash algorithm on the key seed generated by the equipment according to the second preset algorithm to obtain a hash value; to use the data of preset length on a high-order end of the hash value as the master key, and to store the master key into the security storage area.

13. The equipment as claimed in claim 9, wherein the at least one processor is enabled to generate a random number of the key seed length as the key seed by using a real random number generator.

14. The equipment as claimed in claim 9, wherein the at least one processor is further enabled to perform following steps:

generating an exam term according to the mnemonic phrase obtained by the equipment and the preset dictionary; displaying the exam term generated by the equipment, prompting the user to select and receiving the selection information from the user; and in response to determining the selection information received by the equipment from the user is correct according to the mnemonic word, setting the hardware wallet state as initialized, and performing normal operation; in response to determining the selection information input by the user is not correct, returning to the generating the exam term according to the mnemonic phrase obtained by the equipment and the preset dictionary; displaying the exam term generated by the equipment, prompting the user to select and receiving the selection information from the user.

15. The equipment as claimed in claim 14, wherein the at least one processor is enabled to display the mnemonic phrase via a displaying screen of the equipment, display the exam term generated by the equipment on the displaying screen, and prompt the user to select via the displaying screen, and to receive the selection information from the user.

16. The equipment as claimed in claim 9, wherein the at least one processor is enabled to prompt the user to input the letter of the word via the displaying screen of the equipment, search for the corresponding mnemonic word from the preset dictionary according to the letter in the case that the letter input by the user via a key of the equipment is received; display the found mnemonic word via the displaying screen of the equipment and display information of prompting the user to select on the displaying screen, and to receive the selection information from the user.

* * * * *